Patented Dec. 22, 1931

1,837,285

UNITED STATES PATENT OFFICE

BEVERLY OBER, EDWARD H. WIGHT, AND WILLIAM H. WAGGAMAN, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING DOUBLE SUPERPHOSPHATE

No Drawing. Application filed March 12, 1927, Serial No. 175,001. Renewed January 29, 1931.

This invention relates to the production of concentrated fertilizers and more particularly to phosphatic fertilizers.

In the past the customary method of preparing double superphosphate involved two main steps. Phosphate rock is first treated with dilute sulphuric acid or by a heat process to obtain phosphoric acid. This acid is then employed to treat a second batch of phosphate rock resulting in the production of a highly concentracted phosphatic fertilizer, containing as a rule from forty to forty-eight percent of available $P_2O_5$.

To obtain double superphosphate, ground phosphate rock is mixed with this phosphoric acid so obtained in a mixing pan and the resulting mass dumped into a large den. In the den the mass sets to a friable but very damp product. In order to render this suitable for subsequent handling, the water content must be appreciably reduced. This has usually been accomplished by drying the material by the application of extraneous heat. The prior methods used for the production of this fertilizer were carried out in open apparatus.

It is an object of this invention to devise a process for producing concentrated phosphate fertilizers in which an extended curing and reaction period is eliminated.

Another object is to provide a novel method for effectively drying double superphosphate.

Yet another object is to provide a process for manufacturing double superphosphate in which effectual control of the reaction conditions may be exercised.

A further object is to provide a process for manufacturing double superphosphate which insures a complete utilization of the reagent.

With these and other important objects in view, the invention comprises the acidulation of phosphate rock with a reagent, such as phosphoric acid, and in maintaining initial concentrations of the elements of the mass. The invention further comprehends a novel subsequent treatment for the product to insure a rapid and thorough drying.

In our process we contemplate using phosphoric acid prepared in the usual manner. It is to be understood, however, that in place of this we may use phosphorus pentoxide with an appropriate amount of water to acidulate the rock.

To carry out the process, we propose to make use of a container which may be hermetically sealed and which is preferably mounted for rotative movement. A preferred type of mechanism for this purpose may comprise a horizontal rotary autoclave having hollow supporting shafts journaled in suitable bearings. The hollow shafts may serve as inlet conduits for the acidulating reagent and as an outlet vapor line for the gases evolved during reaction. The autoclave is also provided with a relief valve, positioned at any convenient point, which may be manipulated to reduce excessive pressures. The inlet line may be connected to an acid supply and is provided with a control valve for regulating the flow of acid. The vapor outlet may be connected to a vacuum pump in order that autogenous pressures may be reduced at any time and to any desired degree. An additional purpose of the vacuum pump is to obtain sub-atmospheric pressures for a particular stage of the operation, in a manner to appear more fully.

As has been indicated, in the past no attempt has been made to maintain concentration of the original elements of the mass. In the old methods the reactions were carried out in open apparatus, permitting the escape of certain products of reactions by volatilization and entrainment. In our process we are able to maintain the initial concentration of the elements of the mass by prohibiting their escape through volatilization and entrainment.

In conducting our process, phosphate rock is first ground to the desired degree of fineness. While this degree of subdivision may vary through relatively wide limits, we find that very satisfactory results are obtained when ninety percent of the material from the crusher passes a sixty mesh screen. The finely ground rock is then loaded into a hopper and from there a measured quantity is admitted to the autoclave.

After a predetermined quantity of dust has been deposited in the container, the latter is sealed. The driving motor is then started and the autoclave rotated. At this point the acid line is opened by manipulation of the valve and a definite volume of phosphoric acid run in, after which the valve is closed. It will be appreciated that the rock and acid may be admitted either separately or simultaneously to the autoclave under gravity feed, or may be forced in under pressure. Suitable means should be provided to spray the acid over the rock for the entire length of the autoclave.

As the autoclave is rotated the finely ground rock and acid are intimately mixed to form a sludge or slurry. This intimate mixture of the acid with the finely ground rock insures a large reaction area and contact of the acid with the particles of dust. The constant agitation of the mass, due to the continuous rotation of the autoclave, serves to break up the clots or nodules of dust and thus enhances the dispersion of the rock grains in the liquid medium. As the reaction between the acid and phosphatic material proceeds, certain gases are evolved. The amount of generated gases will depend on the composition of the rock and more particularly on the percentage of carbonates, fluorides and other impurities. These evolved gases, being retained in the autoclave, increase the pressure therein. When the pressure generated by these gases becomes excessive, it may be relieved by opening a relief valve placed on the exterior of the autoclave. During this period, the elements of the original mass are retained in their initial concentrations, since escape of either vapors or liquids is prevented. After the materials have been agitated for a time sufficient to insure a complete mixing, the conditions may be adjusted to allow the final reactions to run to completion. To do this, the pressures may be reduced or the temperatures may be increased. In the preferred manner of carrying out the process, we use both means. The pressures may be reduced by opening the relief valve in the manner described. Another and more effective manner of accomplishing this result is to operate the vacuum pump and withdraw any desired quantity of the gases through the vapor line.

During the period that the acid and rock are mixed, certain reactions occur which are exothermic. The heat generated by these reactions are, in most cases, of such a magnitude as to cause vaporization of some of the water in the container. In such circumstances it may be advisable to cool the autoclave before withdrawing generated gases for the purpose mentioned.

The temperature conditions within the autoclave may be accurately controlled to accomplish desired results by providing this element with an external jacket. Through this jacket heating or cooling media may be passed to supply to or abstract heat from the mass inside the container. When it is desired to complete the reactions to form the acid phosphate, a heating medium such as steam may be admitted. As has been explained heretofore, the final reactions may be brought to completion either by decreasing the pressure or by the introduction of this heating medium.

The materials are retained in the sealed autoclave under the newly adjusted temperature and pressure conditions until they have reacted completely to form the desired end products. It will be appreciated from the foregoing description that the provisions for complete mixing and maintenance of concentrations of the elements of the original mass insures a complete reaction and maximum utilization of the acid. In prior processes the product of the reaction between the acid and rock contained a considerable excess of both water and acid. To cure or dry this product, that is to eliminate an excess of water and acid, the material was dried by the application of heat from outside sources. The rehandling of the material and the extended curing period were some of the outstanding disadvantages of the old methods.

We have found the excessive rehandling of the material during the manufacturing process may be entirely eliminated. To do this, we propose to dry the product in the container in which the mixing and conversion stages were carried out. After the conversion has been completed, the relief valve may be opened to reduce the pressure in the autoclave to that of the atmosphere. The valve may then be closed and the vacuum pump put in operation to reduce the pressure in the container below that of the atmosphere. The initial release of pressure, for the drying period, is accompanied by a drop in temperature which aids crystallization. As the pressure is reduced, the gases in the autoclave and the occluded moisture in the product are drawn off through the vapor line. It will be appreciated that by this method any desired degree of dryness may be obtained.

During the drying period the temperatures of the mass in the autoclave may be controlled in any way found necessary to facilitate the obtaining of products of the desired composition. This liquid as vaporized will be drawn off through the vapor line. After the product has been dried, it is then removed from the autoclave and passed through a disintegrator, after which it may be bagged and shipped.

It will be perceived that we have provided a process for manufacturing double superphosphate which may be carried out in a minimum of time and in a single container. Separate stages of mixing, converting and drying may be completed without rehandling the material. By carrying out the process in the manner described, we are enabled to perform with the autoclave the functions heretofore performed by mixing pans, dens and driers and thus accomplish greater economies in plant equipment.

While we have described a specific method of effectuating the underlying principles of the invention, it is to be understood that this is primarily for the purpose of more clearly explaining them. We do not intend to be restricted to any particular sequence of steps or specific treatments of the materials used. Thus, we may first preliminarily mix the rock and acid and admit this to the autoclave before the set up, and, as has been explained, we may utilize phosphorous pentoxide with the requisite quantity of water in lieu of prepared phosphoric acid.

We claim:

1. A process for manufacturing double super-phosphate comprising passing ground phosphate rock and phosphoric acid to a container, allowing the ingredients to react therein at super-atmospheric pressure and subsequently drying the product under reduced pressure in the container.

2. A process for manufacturing double super-phosphate comprising admitting predetermined quantities of ground phosphate rock, phosphorous pent-oxide and water to a container, allowing the ingredients to react therein at super-atmospheric pressure, and drying the product by reducing the pressure in the container.

3. A process for manufacturing double superphosphate comprising mixing phosphate rock and phosphoric acid in a container, hermetically sealing the container, retaining the materials in the container for a time sufficient for the conversion of the insoluble to soluble phosphate and accelerating the crystallization and drying of the product by reducing the pressure in two stages.

4. A process for manufacturing double superphosphate comprising admitting ground phosphate rock and phosphoric acid to a container, sealing the container and rotating it for a period sufficient to insure a thorough mixing of the ingredients while imposing super-atmospheric pressure on the mass; reducing the pressure to accelerate the reactions between the rock and acid and subsequently reducing the pressure below that of the atmosphere as and for the purposes described.

5. A process for manufacturing double super-phosphate comprising admitting ground phosphate rock and phosphoric acid to a container, sealing the container and rotating it for a period sufficient to insure a thorough mixing of the ingredients while imposing super-atmospheric pressure on the mass; increasing the temperature to accelerate the reactions between the rock and acid and subsequently reducing the pressure below that of the atmosphere as and for the purposes described.

6. A process for manufacturing double super-phosphate comprising admitting ground phosphate rock and phosphoric acid to a container, sealing the container and rotating it for a period sufficient to insure a thorough mixing of the ingredients while imposing super-atmospheric pressure on the mass; reducing the pressure and increasing the temperature to accelerate the reactions between the rock and acid and subsequently reducing the pressure below that of the atmosphere for the purposes described.

7. A process for manufacturing double super-phosphate comprising admitting ground phosphate rock, phosphorous pentoxide and water to a container, sealing the container and rotating it for a period sufficient to insure a thorough mixing of the ingredients while imposing super-atmospheric pressure on the mass; reducing the pressure and increasing the temperature to accelerate the reactions between the rock and acid and subsequently reducing the pressure below that of the atmosphere for the purposes described.

8. A process for producing double super-phosphate comprising admitting phosphate rock and phosphoric acid to a container, agitating the mix under super-atmospheric pressures, decreasing the pressure and increasing the temperature to accelerate the reaction between the ingredients and drying the product in the container.

9. A process for producing double super-phosphate comprising admitting phosphate rock and phosphoric acid to a container, agitating the mix under super-atmospheric pressures, decreasing the pressure to accelerate the reaction between the ingredients and drying the product in the container.

10. A process for manufacturing double super-phosphate comprising admitting phosphate rock and phosphoric acid to a container, agitating the mix under super-atmospheric pressures, increasing the temperature to accelerate the reaction between the ingredients and drying the product in the container.

11. A process for producing double super-phosphate comprising admitting phosphate rock and phosphoric acid to a container, agitating the mix under super-atmospheric pressure, decreasing the pressure and increasing the temperature to accelerate the reaction between the ingredients, and drying the product in the container by reducing the pressure therein to aid evaporation of residual liquid.

12. A process of manufacturing double superphosphate comprising forcing ground phosphatic material and phosphoric acid under pressure into a container, sealing the container and rotating it for a period sufficient to insure a thorough mixing of the ingredients while imposing superatmospheric pressure on the mass, reducing pressure to accelerate the reactions between the rock and acid and subsequently reducing the pressure below that of the atmosphere as and for the purposes described.

13. A process of manufacturing double superphosphate, comprising digesting a substantially unset mixture of unavailable phosphate rock dust and a phosphoric acid in a confined space under superatmospheric pressure and temperature, mechanically agitating the mass and retaining it in the space for a period of time sufficient to effect substantial conversion of the unavailable phosphate to available forms.

14. A process of manufacturing phosphate fertilizers comprising mixing ground phosphate rock and phosphoric acid, digesting the mixture, while mechanically agitating it in a confined space under autogenous superatmospheric pressure and applied superatmospheric temperature for a period of time sufficient to effect a substantial conversion of the unavailable phosphates to available phosphates and drying the conversion products.

15. A process of manufacturing double superphosphate fertilizers comprising mixing ground phosphate rock and phosphoric acid, passing the substantially unset mixture to a confined space, digesting the mixture, while mechanically agitating under superatmospheric pressure and applied superatmospheric temperature, continuing the digestion for a period of time such that substantially no free acid is contained in the product, and then drying the product.

16. A process of manufacturing double superphosphate comprising mixing predetermined quantities of finely ground phosphate rock and phosphoric acid, then passing the unset mixture to a confined space, digesting the mass, while mechanically agitating, under autogenous superatmospheric pressures and maintaining the mass at elevated temperatures during the digestion by applying extraneous heat, continuing the digestion for a period of time sufficient to effect a substantial conversion of the unavailable phosphate to available forms, and then drying the product.

17. A process of manufacturing double superphosphate comprising digesting a substantially unset mixture of unavailable phosphate rock dust and phosphoric acid in a confined space under superatmospheric pressure and temperature, mechanically agitating the mass, retaining it in the space for a period of time sufficient to effect substantial conversion of the unavailable phosphate to available forms, and then drying the solid products of conversion.

18. A process for manufacturing double superphosphate comprising charging finely divided phosphate rock dust and phosphoric acid simultaneously to a confined space, digesting the unset mixture of phosphate rock dust and phosphoric acid in the confined space under superatmospheric pressure and temperature, mechanically agitating the mass and retaining it in the space for a period of time sufficient to effect substantial conversion of the unavailable phosphate to double superphosphate.

In testimony whereof we affix our signatures.

BEVERLY OBER.
EDWARD H. WIGHT.
WILLIAM H. WAGGAMAN.